US012722461B2

(12) United States Patent
Pakkam et al.

(10) Patent No.: US 12,722,461 B2
(45) Date of Patent: Sep. 1, 2026

(54) VEHICLE AERODYNAMIC ALTERING SYSTEM AND METHOD

(71) Applicant: Ford Global Technologies, LLC, Dearborn, MI (US)

(72) Inventors: Sriram Pakkam, Royal Oak, MI (US); Michael John Harmon, Northville, MI (US); Marius Curea, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 486 days.

(21) Appl. No.: 18/329,827

(22) Filed: Jun. 6, 2023

(65) Prior Publication Data

US 2024/0034133 A1 Feb. 1, 2024

Related U.S. Application Data

(60) Provisional application No. 63/392,544, filed on Jul. 27, 2022.

(51) Int. Cl.
*B60J 7/14* (2006.01)
*B60J 7/16* (2006.01)
*B62D 35/00* (2006.01)

(52) U.S. Cl.
CPC ............ *B60J 7/141* (2013.01); *B60J 7/1621* (2013.01); *B62D 35/00* (2013.01)

(58) Field of Classification Search
CPC . B60J 7/141; B60J 7/068; B60J 7/1621; B60J 7/042; B62D 35/00; B62D 37/02; B62D 35/007
USPC ... 296/100.11, 100.1, 100.08, 100.06, 181.5, 296/136.03, 136.05, 180.1, 180.5
See application file for complete search history.

(56) References Cited

U.S. PATENT DOCUMENTS 3,508,786 A * 4/1970 Colville .................... B60P 3/32 296/99.1
4,475,759 A 10/1984 Wine
4,496,184 A * 1/1985 Byrd ......................... B60P 7/02 296/180.1
5,213,390 A * 5/1993 Borchers ................. B60P 3/341 296/100.06
5,971,469 A * 10/1999 Lund .......................... B60J 7/08 296/100.06
6,126,229 A * 10/2000 Lund ................... B62D 35/001 296/180.1
6,896,313 B2 5/2005 Mack et al.
7,243,965 B2 * 7/2007 King ...................... B60J 7/1614 296/26.06

(Continued)

FOREIGN PATENT DOCUMENTS

CA 2521840 A1 4/2007
KR 101282896 B1 * 7/2013 ............ B62D 33/02

OTHER PUBLICATIONS

Translation KR-101282896-B1.*

*Primary Examiner* — Amy R Weisberg
*Assistant Examiner* — Denise Lynne Esquivel
(74) *Attorney, Agent, or Firm* — Vichit Chea; Carlson, Gaskey & Olds, P.C.

(57) ABSTRACT

A vehicle system includes a tonneau cover, and an actuator assembly that transitions the tonneau cover back-and-forth between a lowered position and a tilted position. The tonneau cover covers a cargo bed of a vehicle when the tonneau cover is in the lowered position and when the tonneau cover is in the tilted position.

20 Claims, 8 Drawing Sheets

(56) References Cited

U.S. PATENT DOCUMENTS 9,944,216 B2 4/2018 Hannan et al.
10,053,160 B2 * 8/2018 Erlandson .............. B62D 35/00
11,267,321 B2 * 3/2022 Jocz ......................... B60J 7/068
12,103,371 B2 * 10/2024 Salter ................... B62D 35/001
2006/0066130 A1 * 3/2006 King ...................... B60J 7/1614
296/100.1
2010/0276967 A1 * 11/2010 Berg .................. B62D 33/0273
296/180.1
2011/0204672 A1 * 8/2011 Herndon .............. B62D 35/001
296/100.06
2016/0039275 A1 * 2/2016 Rohr ........................ B60J 5/108
296/100.06
2018/0339578 A1 * 11/2018 Sullivan .................... B60R 9/00
2019/0210664 A1 * 7/2019 Williams .................. B60P 7/14
2022/0242208 A1 * 8/2022 Klein ....................... B60J 7/062

* cited by examiner 110
144P
144D
150

110
144P
144D
150

VEHICLE AERODYNAMIC ALTERING SYSTEM AND METHOD

CROSS-REFERENCE TO RELATED APPLICATIONS

This application claims priority to U.S. Provisional Application No. 63/392,544, which was filed on 27 Jul. 2022 and is incorporated herein by reference in its entirety.

TECHNICAL FIELD

This disclosure relates generally to systems that alter aerodynamics of a vehicle particularly aerodynamics associated with a cargo bed of the vehicle.

BACKGROUND

Some vehicles, such as pickup trucks, include a cargo bed. Users utilize cargo beds to carry various types of cargo. The cargo bed can be located aft of a passenger compartment of the vehicle. The cargo bed can alter flow as the vehicle is driven.

SUMMARY

In some aspects, the techniques described herein relate to a vehicle system, including: a tonneau cover; and an actuator assembly that transitions the tonneau cover back-and-forth between a lowered position and a tilted position, the tonneau cover covering a cargo bed of a vehicle when the tonneau cover is in the lowered position and when the tonneau cover is in the tilted position.

In some aspects, the techniques described herein relate to a vehicle system, wherein, in the tilted position, a top of the tonneau cover tapers downward moving rearward from a forward edge of the tonneau cover.

In some aspects, the techniques described herein relate to a vehicle system, wherein the tonneau cover includes the top, and opposing wedge-shaped sides extending vertically downward from the top.

In some aspects, the techniques described herein relate to a vehicle system, wherein the cargo bed includes opposing bed walls, the wedge-shaped sides of the tonneau cover raised above the opposing bed walls when the tonneau cover is in the tilted position, the wedge-shaped sides inboard the bed walls when the tonneau cover is in the lowered position.

In some aspects, the techniques described herein relate to a vehicle system, wherein, in the tilted position, a leading edge of the tonneau cover is vertically elevated relative to a trailing edge of the tonneau cover.

In some aspects, the techniques described herein relate to a vehicle system, further including a diffuser extending aftward from a passenger compartment of the vehicle, the diffuser including a horizontally extending portion, a first vertically extending portion on a driver side, and a second vertically extending portion on a passenger side.

In some aspects, the techniques described herein relate to a vehicle system, wherein the first and second vertically extending portions extend upward from respective cargo bed walls to the horizontally extending portion.

In some aspects, the techniques described herein relate to a vehicle system, wherein, in the tilted position, the diffuser interfaces with a vertically extending driver side of the tonneau cover, a top of the tonneau cover, and a vertically extending passenger side of the tonneau cover.

In some aspects, the techniques described herein relate to a vehicle system, wherein interfaces between the diffuser and the tonneau cover when the tonneau cover is in the tilted position are sealed.

In some aspects, the techniques described herein relate to a vehicle system, including at least one access panel in a top of the tonneau cover, the at least one access panel movable back-and-forth between an open position and a closed position, the cargo bed accessible through an access window in the top of the tonneau cover when the at least one access panel is in the open position.

In some aspects, the techniques described herein relate to a vehicle system, wherein the access window has a cross-vehicle width that is less than a cross-vehicle width of the cargo bed.

In some aspects, the techniques described herein relate to a vehicle system, wherein the top of the tonneau cover includes a driver side leg and a passenger side leg that establish respective outboard sides of the access window.

In some aspects, the techniques described herein relate to a vehicle system, wherein a drag coefficient of the vehicle is lower when the tonneau cover is in the tilted position than when the tonneau cover is in the lowered position.

In some aspects, the techniques described herein relate to a vehicle system, wherein the actuator assembly includes at least one linear actuator.

In some aspects, the techniques described herein relate to an aerodynamic adjustment method: transitioning a tonneau cover from a lowered position to a tilted position to reduce a drag coefficient of a vehicle.

In some aspects, the techniques described herein relate to an aerodynamic adjustment method, including transitioning the tonneau cover from the tilted position to the lowered position to facilitate accessing a cargo bed of the vehicle.

In some aspects, the techniques described herein relate to an aerodynamic adjustment method, wherein the transitioning includes an automatic transitioning made in response to an operational condition of the vehicle.

In some aspects, the techniques described herein relate to an aerodynamic adjustment method, wherein the operational condition includes a speed of the vehicle.

In some aspects, the techniques described herein relate to an aerodynamic adjustment method, wherein a cargo bed includes opposing bed walls, wherein the tonneau cover includes wedge-shaped sides that are inboard the bed walls and are raised above the bed walls when the tonneau cover is in the tilted position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details vehicle systems that can be deployed to alter aerodynamics of a vehicle and particularly aerodynamics associated with a cargo bed area of a vehicle. The systems can be deployed to reduce an aerodynamic drag on the vehicle.

Figure 1:
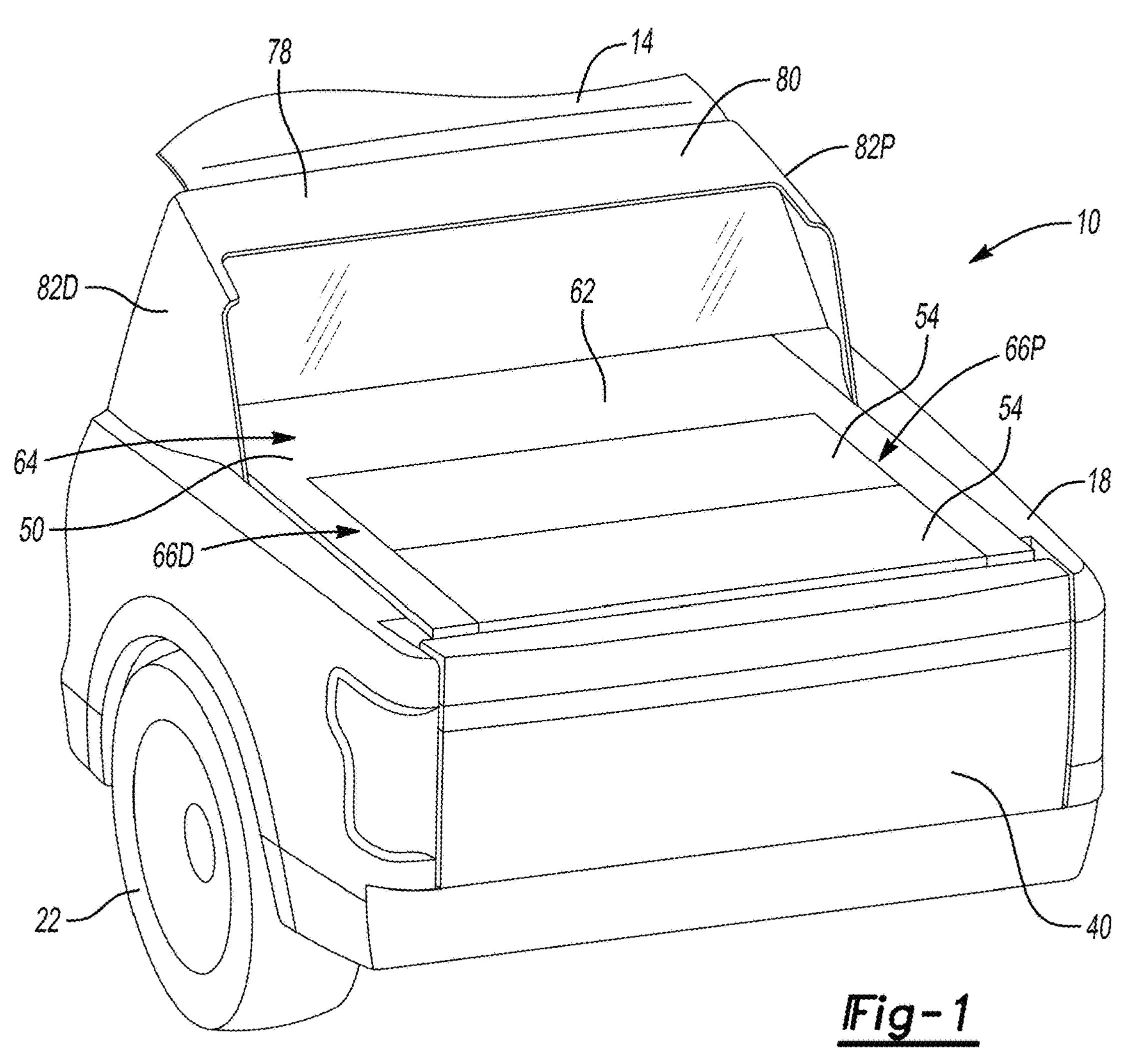
FIG. 1 illustrates a vehicle having an aerodynamic altering system according to an exemplary aspect of the present disclosure with the system comprising a tonneau cover shown in a lowered position.

With reference to FIG. 1, a vehicle 10 includes a passenger compartment 14 and a cargo bed 18 that is aft the passenger compartment 14 along a longitudinal axis of the vehicle 10.

In the exemplary embodiment, the vehicle 10 is a pickup truck. The vehicle 10 could be another type of vehicle in another example, such as a car, van, SUV, etc. The exemplary vehicle 10 has a unibody structure. In other embodiments, the vehicle 10 could have a body-on-frame architecture.

The vehicle 10 is an electrified vehicle. In particular, the vehicle 10 is a battery electric vehicle (BEV). In another example, the vehicle could be another type of electrified vehicle, such as a plug-in hybrid electric vehicle (PHEV), or a conventional vehicle that is exclusive powered by an internal combustion engine.

The exemplary vehicle 10 includes an electrified powertrain capable of applying torque from an electric machine 20 (e.g., an electric motor) to drive one or more drive wheels 22. A traction battery pack 24 of the vehicle 10 powers the electric machine, and potentially, other electrical loads of the vehicle 10. In some examples, the powertrain of the vehicle 10 can electrically propel the drive wheels 22 either with or without the assistance of an internal combustion engine.

As can be appreciated, aerodynamics of the vehicle 10 can affect the operational efficiency of the vehicle 10. Reducing aerodynamic drag can decrease required power from the traction battery pack 24.

Generally, the cargo bed 18 is provided by a floor 30, a front wall 34, a driver side cargo bed wall 38D, a passenger side cargo bed wall 38P, and a tailgate 40. The cargo bed 18 can contribute to aerodynamic drag. The exemplary vehicle 10 incorporates an aerodynamic altering system that can move to influence aerodynamic drag in the area of the cargo bed 18

A tonneau cover 50 covers the cargo bed 18. The tonneau cover 50 can include an acrylonitrile butadiene styrene (ABS) material wrapped about an aluminum core.

The example tonneau cover 50 includes at least one access panel 54. In FIG. 1, the at least one access panel 54 is shown in a closed position. The at least one access panel 54 can be is movable from the closed position of FIG. 1 to the open position of FIG. 3. This opens an access window 58 within the tonneau cover 50. A user can access the cargo bed 18 through the access window 58. The access window 58 can also provide clearance necessary to carry taller cargo within the cargo bed 18. The tailgate 40 can be rotated to the open position shown in FIG. 2 to provide additional access to the cargo bed 18.

The tonneau cover 50 has a top 62 that provides the access window 58. The top 62 includes a forward primary portion 64 that spans across the cargo bed 18 in a cross-vehicle direction. The top 62 additionally includes a driver side leg 66D and a passenger side leg 66P that extend rearward from the forward primary portion 64 to define laterally outboard sides of the access window 58. Forward and rearward, for purposes of this disclosure are with reference to a general orientation of the vehicle 10. Similarly, vertical and horizontal, for purposes of the this disclosure are with general orientation of the vehicle 10 during ordinary operation.

The access panels 54 are, when closed, disposed in a common plane with the forward primary portion 64, the driver side leg 66D, and the passenger side leg 66P. The access panels 54 are disposed between the driver side leg 66D and the passenger side leg 66P. Notably, the example access panels 54 do not extend across an entirety of a cross-vehicle width of the cargo bed 18. The access window 58 thus has a window with $W_w$ that is less than a cross-vehicle width of the cargo bed $W_{CB}$.

Figure 4:
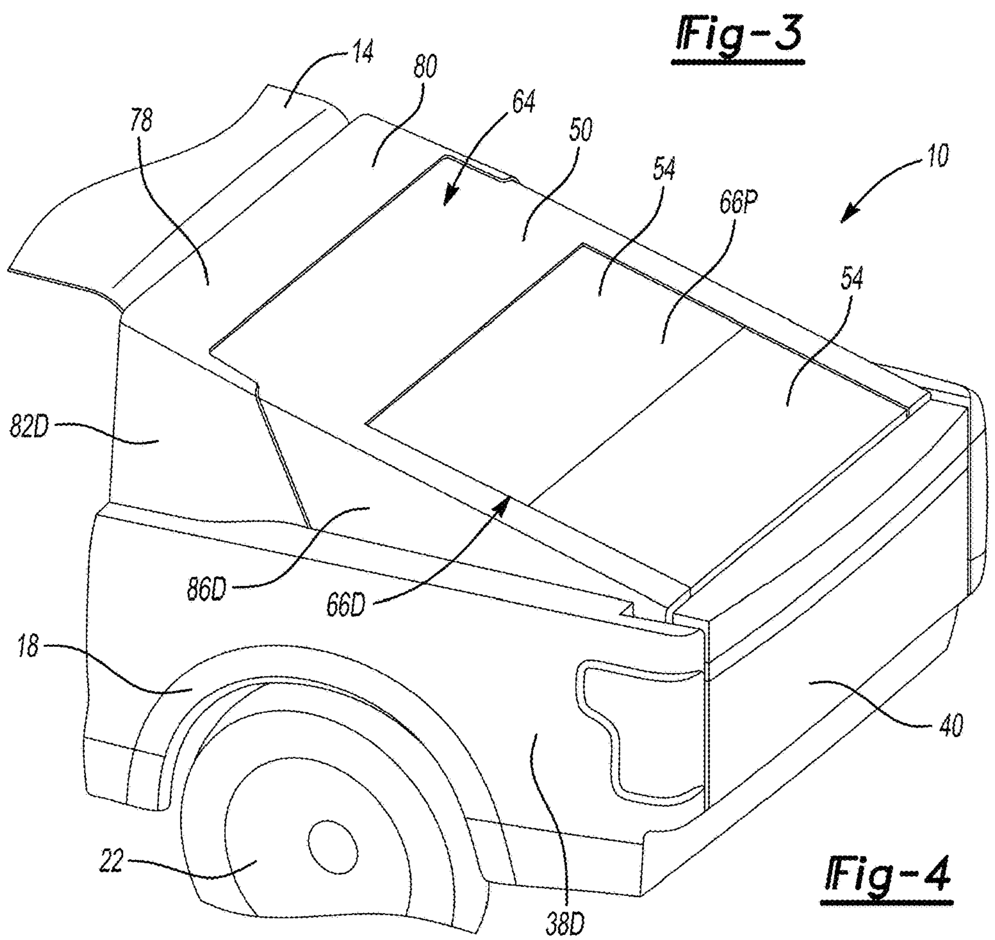
FIG. 4 illustrates the vehicle of FIG. 1 with the tonneau cover of the aerodynamic altering system transitioned to a tilted position.
Figure 5:
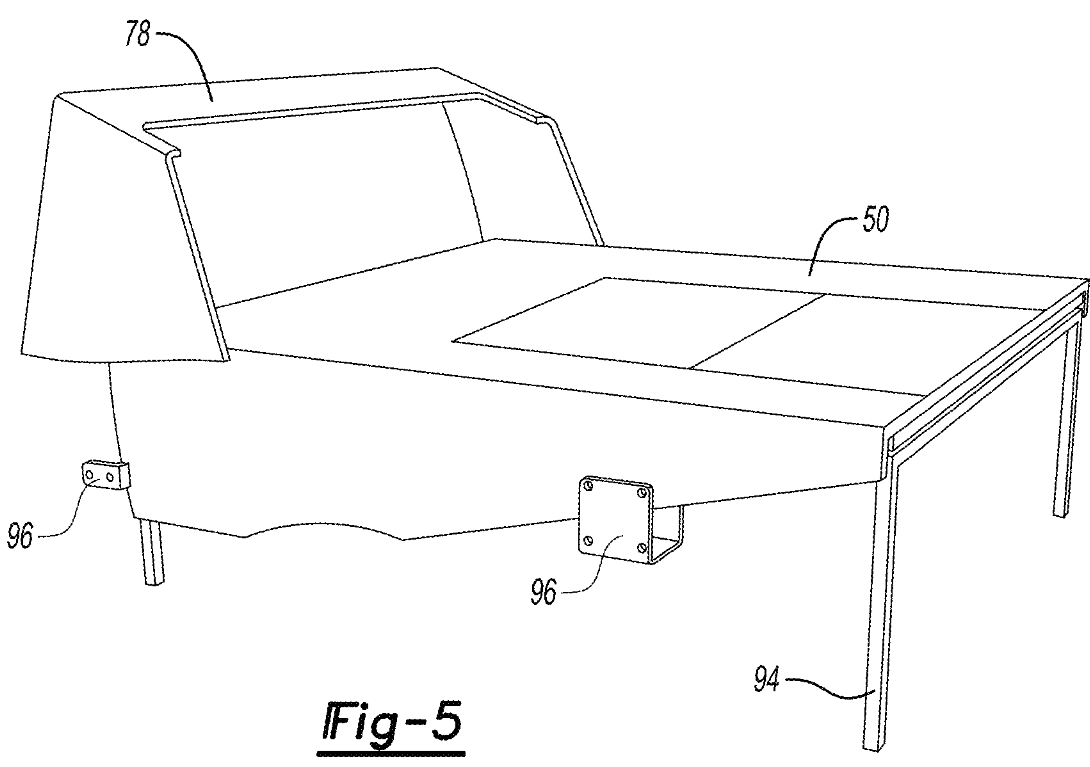
FIG. 5 illustrates a perspective view of the aerodynamic altering system of FIGS. 1-4 with the tonneau cover in the lowered position.
Figure 6:
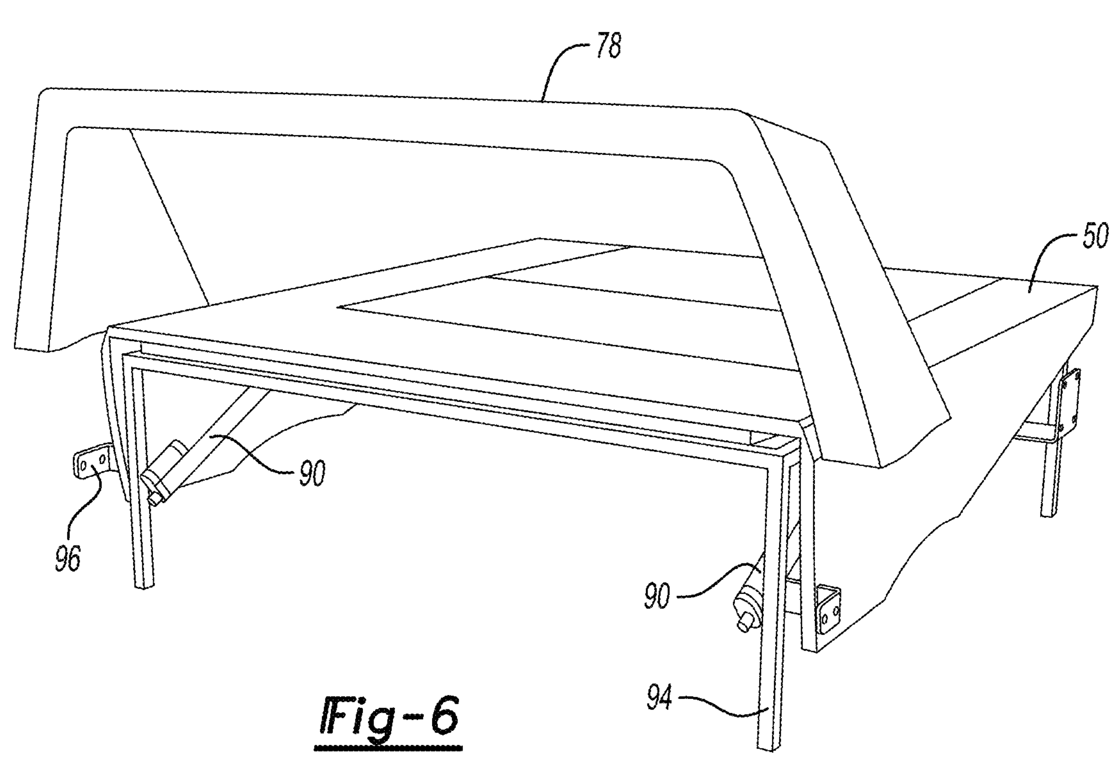
FIG. 6 illustrates another perspective view of the aerodynamic system of FIG. 4.
Figure 7:
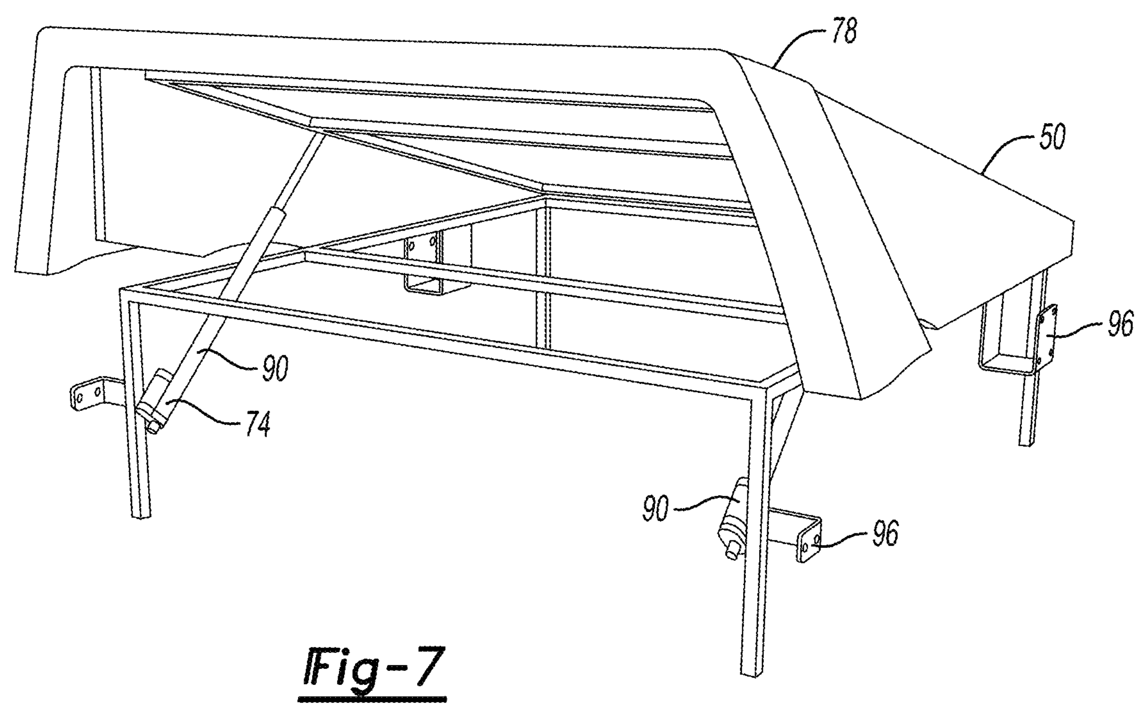
FIG. 7 illustrates a perspective view of the aerodynamic altering system of FIGS. 1-4 with the tonneau cover in the tilted position.
Figure 8:
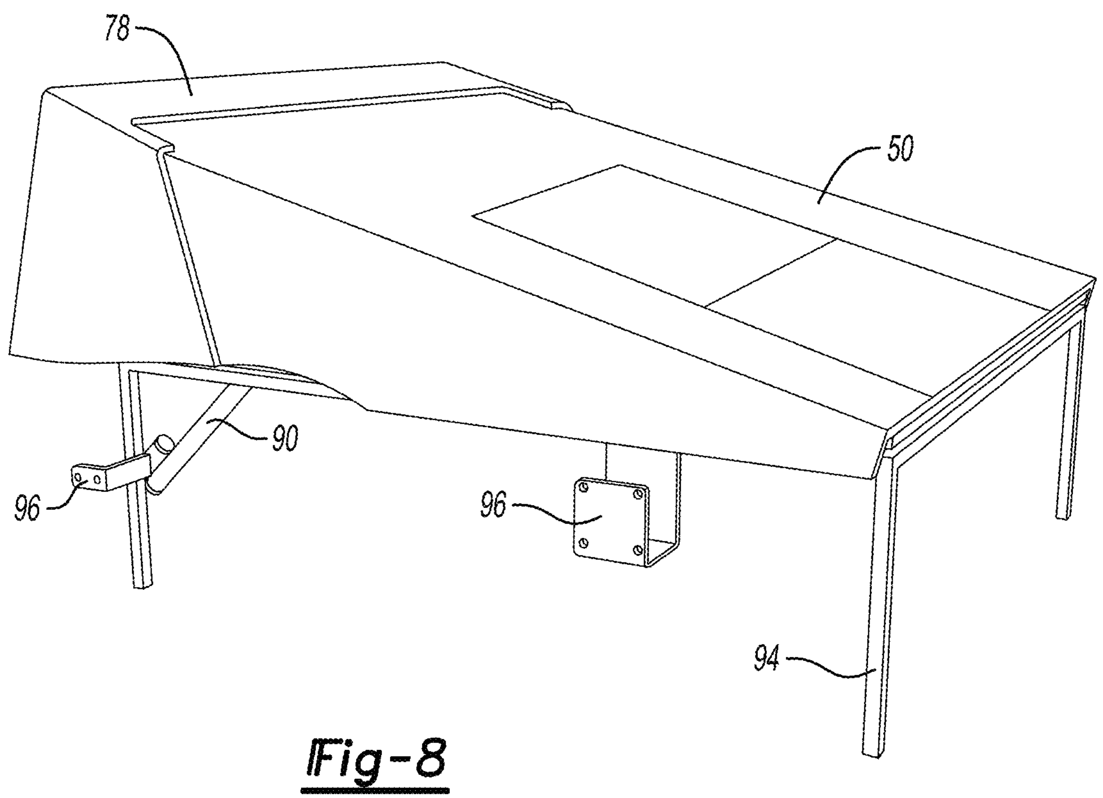
FIG. 8 illustrates another perspective view of aerodynamic altering system of FIG. 7.
Figure 9:
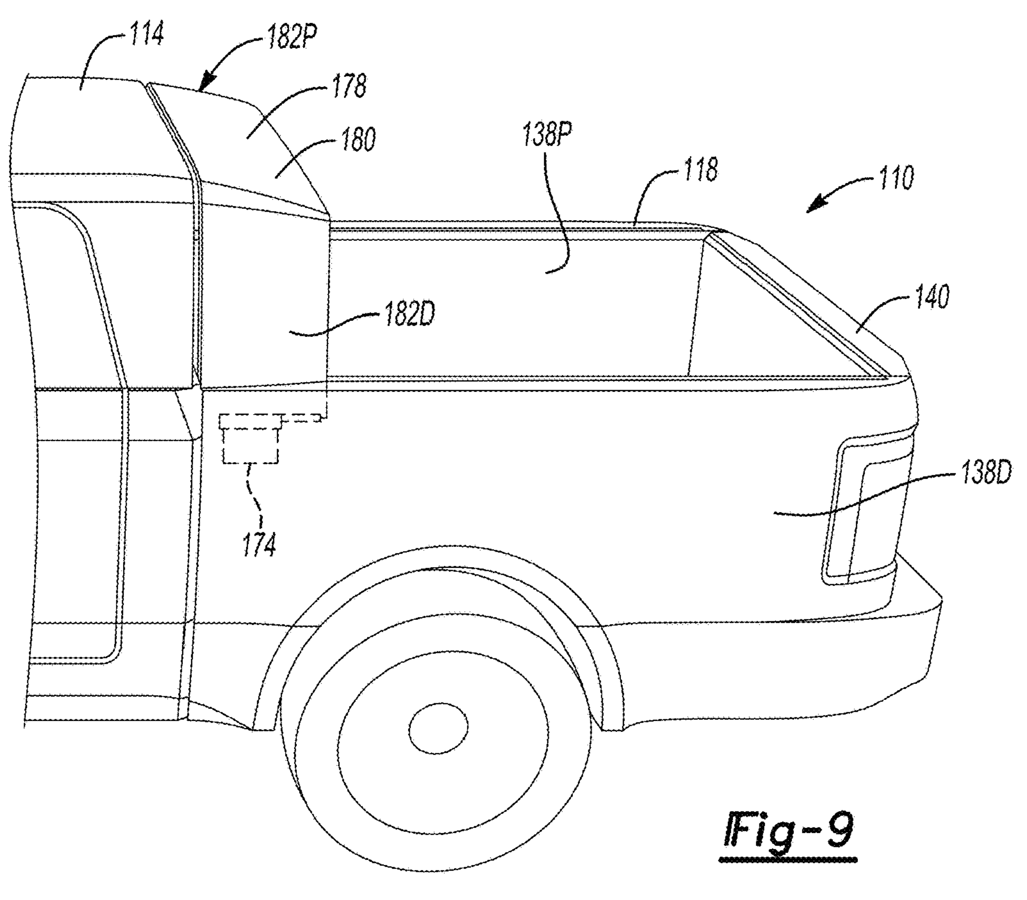
FIG. 9 illustrates a vehicle having an aerodynamic altering system according to another exemplary aspect of the present disclosure with the system in a retracted position.
Figure 10:
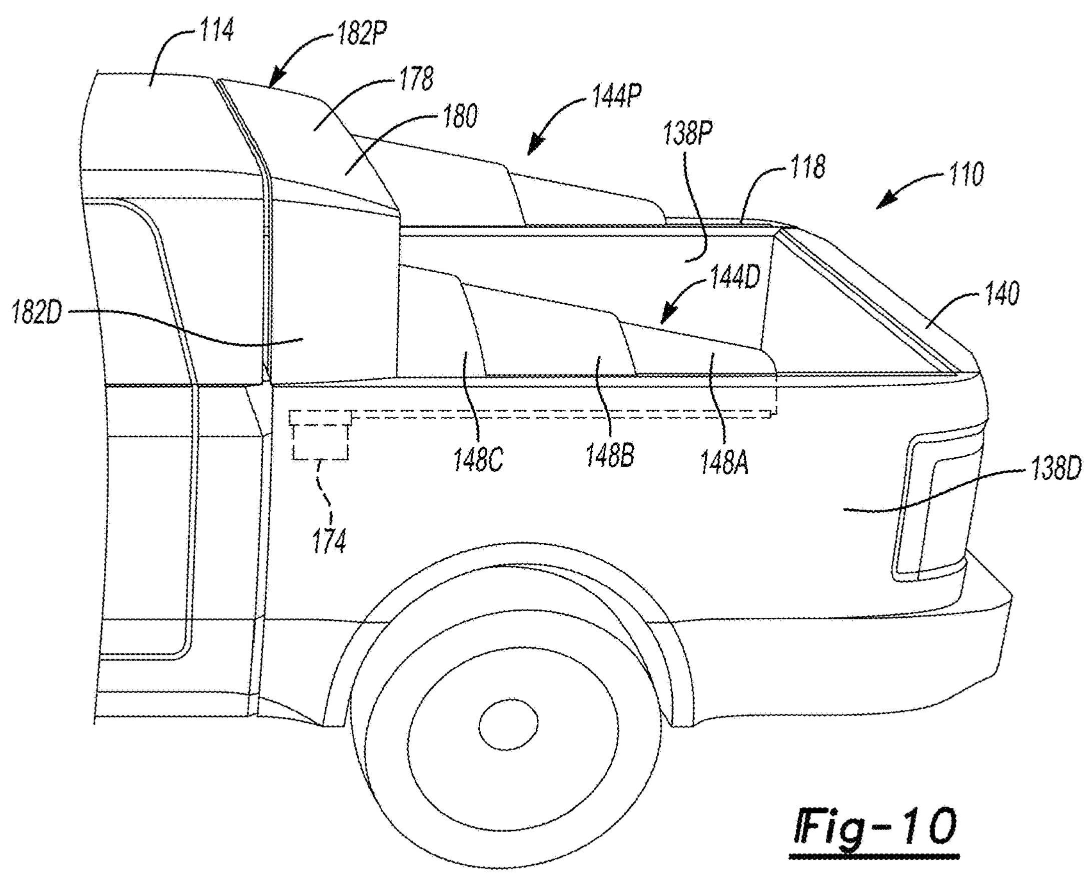
FIG. 10 illustrates the vehicle of FIG. 9 with the system moved from the retracted position toward a deployed position.
Figure 11:
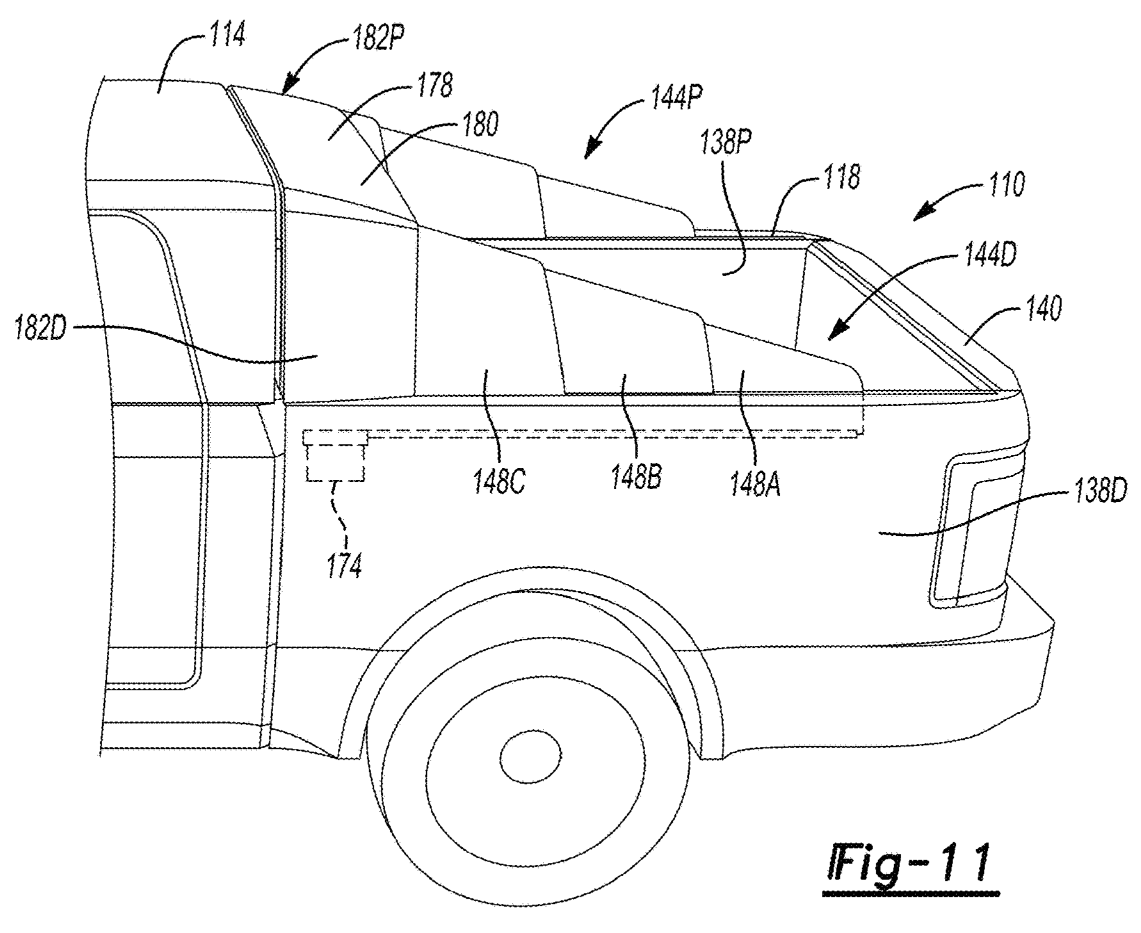
FIG. 11 illustrates the vehicle of FIG. 9 with the system moved to the deployed position.
Figure 12:
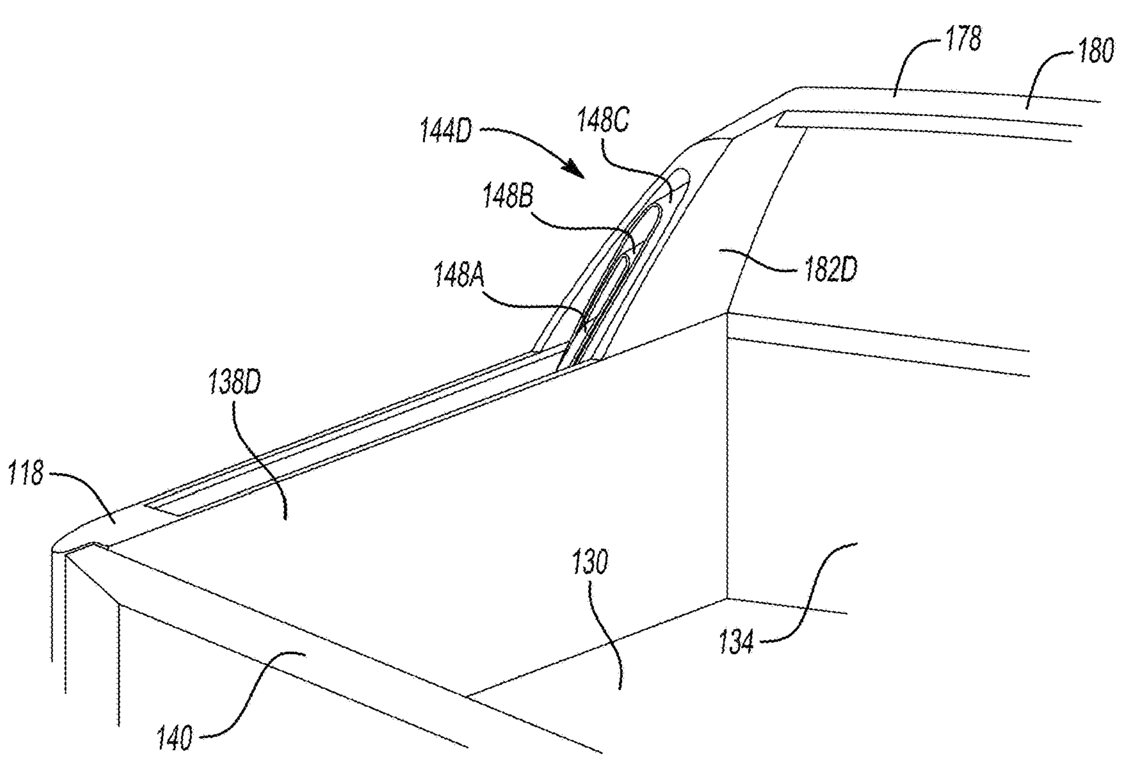
FIG. 12 illustrates a close-up, perspective view of a driver side area of the vehicle of FIG. 9 where the system is in a retracted position.
Figure 13:
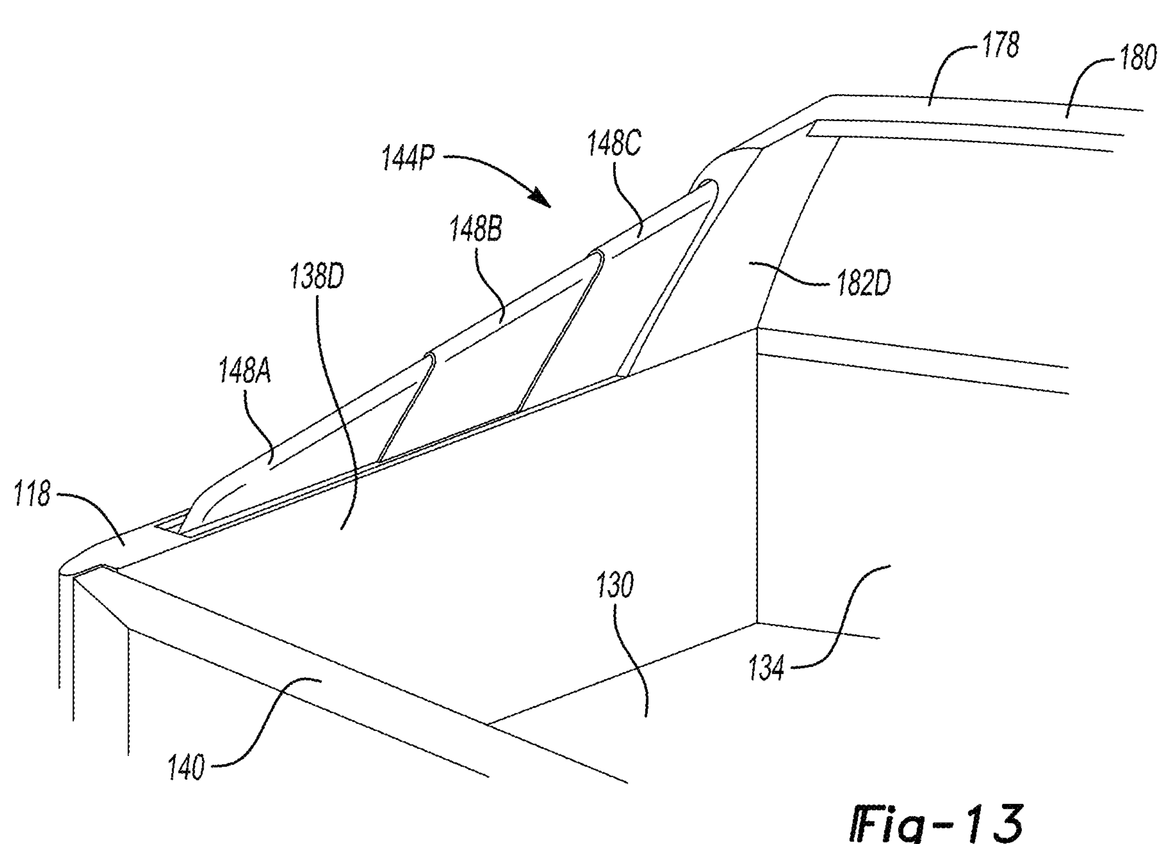
FIG. 13 illustrates a close-up, perspective view of the area shown in FIG. 12 with the system in the deployed position.

An actuator assembly 74 of the aerodynamic altering system transitions the tonneau cover 50 to influence aerodynamic drag. The example actuator assembly 74 can transition the tonneau cover 50 back-and-forth between the lowered position of FIG. 1 and the tilted position of FIG. 4. The tonneau cover 50 can thus be considered an active tonneau cover. Operating the vehicle 10 with the tonneau cover 50 in the tilted position reduces aerodynamic drag when compared to operating the vehicle 10 with the tonneau cover 50 in the lowered position. That is, a drag coefficient of the vehicle 10 is lower when the tonneau cover 50 is in the tilted position than when the tonneau cover 50 is in the lowered position.

When in the tilted position the tonneau cover 50 interfaces with a diffuser 78 that extends aftward from the passenger compartment 14 of the vehicle 10. The diffuser 78 includes a horizontally extending portion 80, and opposing vertically extending portions 82D and 82P extending downward from the respective driver side and passenger side of the horizontally extending portion 80. The vertically extending portions

82D and 82P extend upward from respective cargo bed walls 38D and 38P to the horizontally extending portion 80. The diffuser 78 can help to manage flow moving over the passenger compartment 14 to the tonneau cover 50.

In the tilted position, the top 62 of the tonneau cover 50 tapers vertically downward when moving rearward from a forward edge of the tonneau cover 50, and a leading edge of the tonneau cover 50 is vertically elevated relative to a trailing edge of the tonneau cover 50. Further, in the tilted position, a driver side tonneau wall 86D and a passenger side tonneau wall 86P of the tonneau cover 50 are exposed. The driver side tonneau wall 86D and the passenger side tonneau wall 86P are wedge-shaped in this example, with apexes of the wedges a rear area of the tonneau cover 50.

The driver side tonneau wall 86D and the passenger side tonneau wall 86P extend downward from opposite outboard edges of the top 62 of tonneau cover 50. When the tonneau cover 50 is in the lowered position of FIGS. 1 and 3, the driver side tonneau wall 86D and the passenger side tonneau wall 86P are inboard the driver side cargo bed wall 38D and the passenger side cargo bed wall 38P. In other examples, the driver side tonneau wall 86D and the passenger side tonneau wall 86P could fit within slots of the driver side cargo bed wall 38D and the passenger side cargo bed wall 38P when the tonneau cover 50 is in the lowered position.

The diffuser 78 overlaps forward portions of the tonneau cover 50 when the tonneau cover 50 is in the tilted position. The interfaces between the tonneau cover 50 and the diffuser 78 when the tonneau cover 50 is in the tilted position can be sealed interfaces. Seals, for example, could be sandwiched between the vertically extending portions 82D, 82P of the diffuser 78, and the respective driver side tonneau wall 86D or passenger side tonneau wall 86P of the tonneau cover 50. Seals could additionally be disposed between the top 62 of the tonneau cover 50 and the horizontally extending portion 80 of the diffuser 78. Raising the tonneau cover 50 from the lowered position to the tilted position can compress the seals to establish the sealing interfaces.

Figure 2:
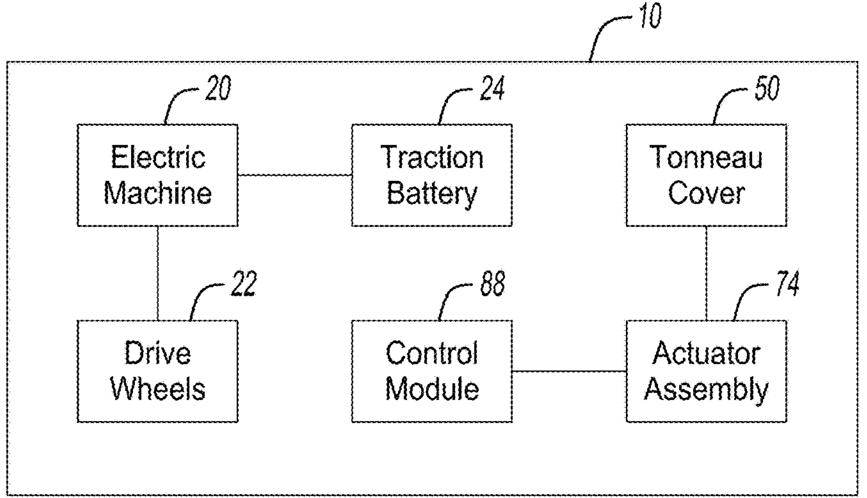
FIG. 2 illustrates a highly schematic view of the vehicle of FIG. 1.
Figure 3:
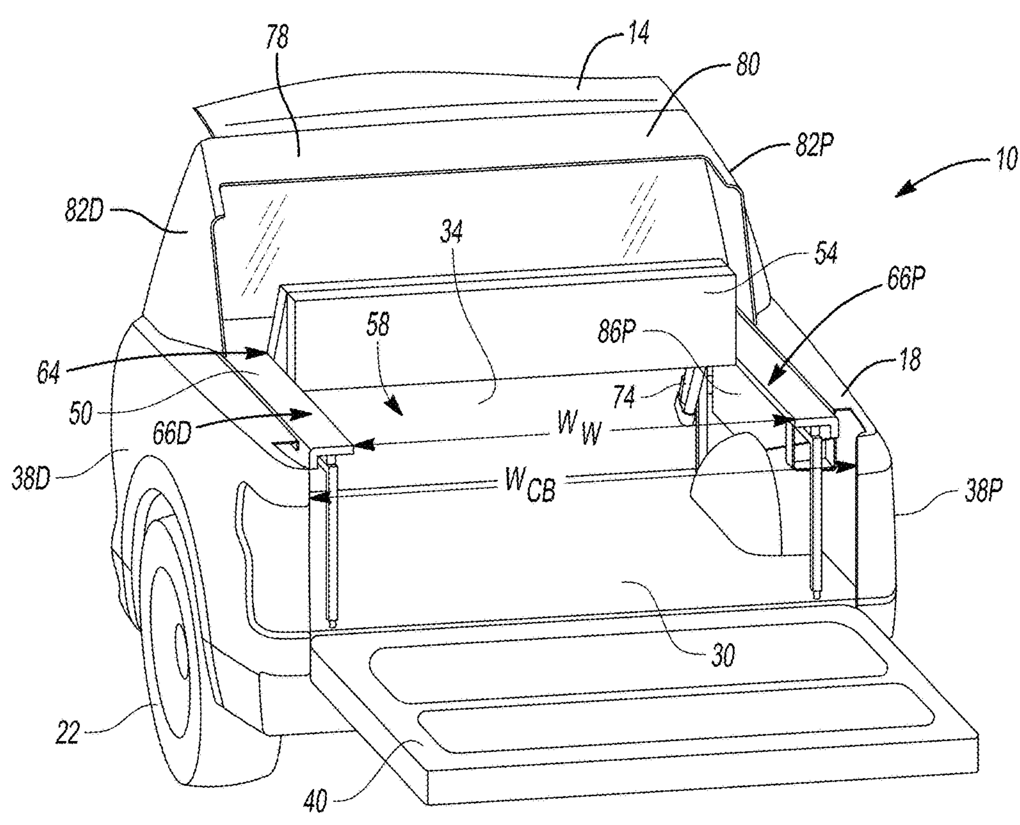
FIG. 3 illustrates the vehicle of FIG. 1 with at least one access panel of the tonneau cover moved to an open position and a tailgate of the vehicle in an open position.

With reference now to FIGS. 5-8 and continuing reference to FIGS. 1-4, transitioning the tonneau cover 50 back and forth between the lowered position of FIG. 1 and the tilted position of FIG. 3 can involve a powering of the actuator assembly 74.

The vehicle 10 can include a control module 88 (FIG. 2) that is utilized to control and coordinate the exemplary methods of making aerodynamic adjustments using the aerodynamic altering system. The control module 88 can be part of larger module within the vehicle 10. The control module 88, in this example, includes a processor operatively linked to a memory portion. The example processor can be programmed to execute a program stored in the memory portion. The program may be stored in the memory portion as software code. The program stored in the memory portion may include one or more additional or separate programs, each of which includes an ordered list of executable instructions for implementing logical functions.

The processor can be a custom made or commercially available processor, a central processing unit (CPU), an auxiliary processor among several processors associated with the control module, a semiconductor based microprocessor (in the form of a microchip or chip set) or generally any device for executing software instructions.

The memory portion can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). The memory may incorporate electronic, magnetic, optical, and/or other types of storage media.

In this example, the actuator assembly 74 includes, among other things, linear actuators 90 that can extend and retract to respectively raise the tonneau cover 50 to the tilted position and lower the tonneau cover 50 to the lowered position. The linear actuators 90 extend and retract in response to a signal from the control module 88. The linear actuators 90 are supported on a frame structure 94, which can be secured to the bed walls 38D, 38P utilizing a plurality of brackets 96.

The linear actuators 90 can be activated by the control module 88 to automatically transition the tonneau cover 50 in response to particular operational conditions of the vehicle 10. For example, when the vehicle 10 meets or exceeds a threshold speed, say 10 mph, the control module 88 can activate the linear actuators 90 to extend the linear actuators 90 and raise the tonneau cover 50 to the tilted position. When the speed of the vehicle 10 drops back below the threshold speed, the control module 88 can activate the linear actuators 90 to retract the linear actuators 90 and retract the tonneau cover 50 from the tilted position back to the lowered position.

The lowered position can facilitate a user adding and remove cargo from the cargo bed 18. The lowered position may also be considered more aesthetically pleasing than the tilted position when the vehicle 10 is stationary or operating at speeds below the threshold speed. When the vehicle 10 is stationary or moving below the threshold speed, the aerodynamic benefits provided by the tonneau cover 50 may not be required.

With reference now to FIGS. 9-13, another example vehicle 110 includes a passenger compartment 114 and a cargo bed 118 that is aft the passenger compartment 114 along a longitudinal axis of the vehicle 110.

The cargo bed 118 provided by a floor 130, a front wall 134, a driver side cargo bed wall 138D, a passenger side cargo bed wall 138P, and a tailgate 140. The cargo bed 118 can contribute to aerodynamic drag. The exemplary vehicle 110 incorporates an aerodynamic altering system that can move to influence aerodynamic drag in the area of the cargo bed 118

The exemplary aerodynamic altering system of the vehicle 110 includes plurality of fins 144D engaging the driver side cargo bed wall 138D, and a plurality of fins 144P engaging the passenger side cargo bed wall 138P.

The fins 144D and 144P are disposed along a vertical top of the cargo bed wall 138D and the cargo bed wall 138P, respectively. The fins 144D and 144P slidable engage the walls 138D and 138P and are configured to move telescopically back-and-forth between a stowed position and a deployed position. The fins 144D and 144P provide a wedge-shaped buttressed when in the deployed position. The fins 144D and 144P extend to an aft end of the cargo bed 118 when the fins 144D and 144P are in the deployed position.

The fins 144D and 144P in the deployed position redirect airflow around the cargo bed 118. When the fins 144D and 144P are in the deployed position, a drag coefficient of the vehicle 110 is lower that when the plurality of fins 144D and 144P are in the stowed position.

When the example fins 144D and 144P are in the stowed position, the fins 144D and 144P nest within each other. For example, with reference to the fins 144D being in the stowed position, a first fin 148A is held within an aperture of a second fins 148B, and the first fin 148A and 148B are held within an aperture of a third fin 14C.

The fins 144D can move within a track along the vertical top of the cargo bed wall 138D. In some examples, to move the fins 144D, a linear actuator 174 within the cargo bed wall 138D is coupled to the first fin 148A, which is the aftmost fin when the fins 144D are in the deployed position. In this example, only the first fin 148A is directly driven by the linear actuator 174. The linear actuator 174 can extend to move the first fin 148A to the deployed position. The second fin 148B and third fin 148C are connected to the first fin 148A and pulled to the deployed position when the first fin 148A is moved by the linear actuator 174. The linear actuator 174 retracts to draw the first fin 148A to the retracted position. The second fin 148B and third fin 148C are pushed by the first fin 148A back to the retracted position. The fins 144P can be similarly driven by a linear actuator in the cargo bed wall 138P.

The linear actuator 174 or other actuator used to move the fins 144D can be controlled and activated using a control module, such as the control module 88 described in connection with FIG. 2. The linear actuator 174 can be activated to extend when the vehicle 110 reaches a threshold speed. The linear actuator 174 can be activate to retract when the vehicle 110 drops back below the threshold speed. Thus, the fins 144D are retracted when the vehicle 110 is stationary and the fins 144D do not interfere with a user loading the cargo bed 118 over the driver side cargo bed wall 138D.

Like the vehicle 10 of FIG. 1, the vehicle 110 includes a diffuser 178 extending aftward from the passenger compartment 114 of the vehicle 110. The diffuser 178 includes a horizontally extending portion 180, and opposing vertically extending portions 182D and 182P extending downward from the respective driver side and passenger side of the horizontally extending portion 180. The vertically extending portions 182D and 182P extend upward from respective cargo bed walls 138D and 138P to the horizontally extending portion 180. The diffuser 178 can help to manage flow moving over the passenger compartment 114 to the tonneau cover 150.

When the fins 144D and 144P are in the stowed positions, the fins 144D and 144P are at least partially received within the respective vertically extending portions 182D and 182P.

Figure 14:
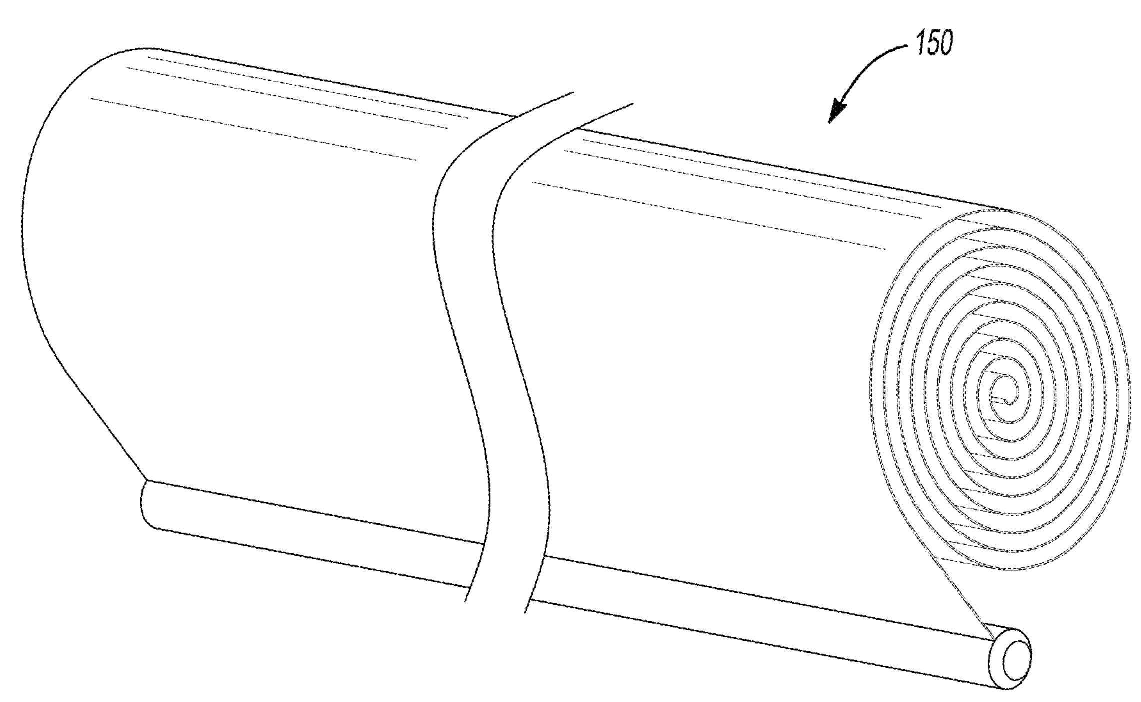
FIG. 14 illustrates a rollable tonneau cover.
Figures 15, 16:
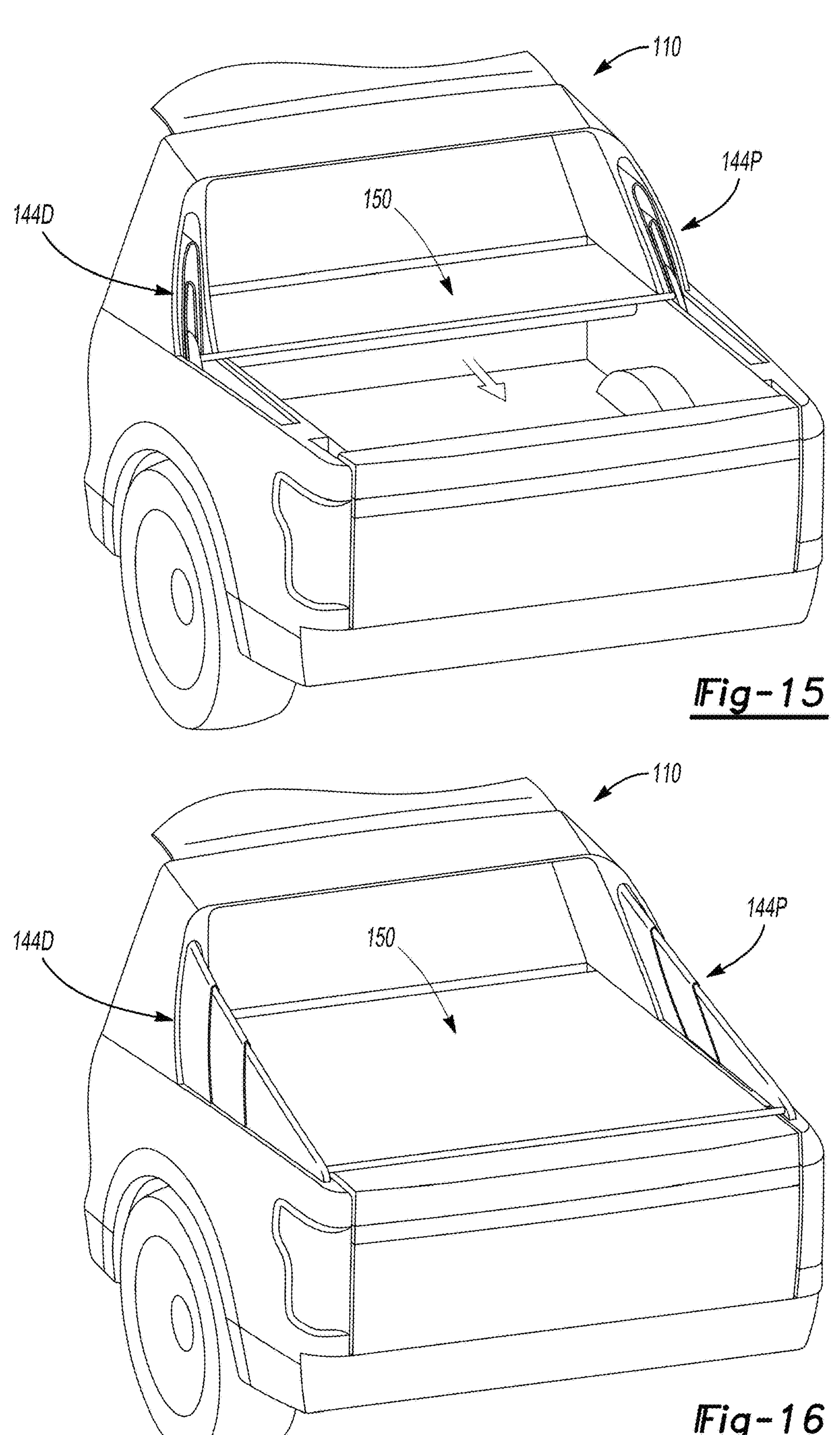
FIG. 15 illustrates the vehicle of FIG. 9 with the system in the retracted position and the system being used with a rollable tonneau cover.
FIG. 16 illustrates the vehicle of FIG. 9 with the system in the deployed position and the system being used with the rollable tonneau cover.

With reference to FIGS. 14-16, in some examples, the fins 144D and 144P are attached to a tonneau cover 150, which is rollable in this example. When the fins 144D and 144P are deployed, the fins 144D and 144P pull the tonneau cover 150 to unroll the tonneau cover 150 over the cargo bed 188. The tonneau cover 150 rolls back up when the fins 144D and 144P retract back to the stowed position. The tonneau cover 150 thus moves with the fins 144D and 144P.

The disclosed example aerodynamic systems can be deployable when a vehicle is travelling at certain speeds to provide aerodynamic gains, which can be especially useful for electrified vehicles that rely on traction batteries for propulsion. The systems can then retract when the vehicle is parked so the systems do not interfere with access to a cargo bed of the vehicle.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A vehicle system, comprising:

a tonneau cover; and an actuator assembly that transitions the tonneau cover back-and-forth between a lowered position and a tilted position, the tonneau cover covering a cargo bed of a vehicle when the tonneau cover is in the lowered position and when the tonneau cover is in the tilted position, wherein, in the tilted position, a top of the tonneau cover tapers downward moving rearward from a forward edge of the tonneau cover, wherein the tonneau cover includes the top, and opposing wedge-shaped sides extending vertically downward from the top.

2. The vehicle system of claim 1, wherein the cargo bed includes opposing bed walls, the wedge-shaped sides of the tonneau cover raised above the opposing bed walls when the tonneau cover is in the tilted position, the wedge-shaped sides inboard the bed walls when the tonneau cover is in the lowered position, the opposing wedge-shaped sides moving with the top between the lowered position and the tilted position as the actuator assembly transitions the tonneau cover, the opposing wedge-shaped sides extending downward from the top when the tonneau cover is in the lowered position.

3. The vehicle system of claim 1, wherein, in the tilted position, a leading edge of the tonneau cover is vertically elevated relative to a trailing edge of the tonneau cover.

4. The vehicle system of claim 1, further comprising a diffuser extending aftward from a passenger compartment of the vehicle, the diffuser including a horizontally extending portion, a first vertically extending portion on a driver side, and a second vertically extending portion on a passenger side.

5. The vehicle system of claim 4, wherein the first and second vertically extending portions extend upward from respective cargo bed walls to the horizontally extending portion.

6. The vehicle system of claim 4, wherein, in the tilted position, the diffuser interfaces with a vertically extending driver side of the tonneau cover, a top of the tonneau cover, and a vertically extending passenger side of the tonneau cover.

7. The vehicle system of claim 6, wherein interfaces between the diffuser and the tonneau cover when the tonneau cover is in the tilted position are sealed.

8. The vehicle system of claim 1, including at least one access panel in a top of the tonneau cover, the at least one access panel movable back-and-forth between an open position and a closed position, the cargo bed accessible through an access window in the top of the tonneau cover when the at least one access panel is in the open position.

9. The vehicle system of claim 8, wherein the access window has a cross-vehicle width that is less than a cross-vehicle width of the cargo bed.

10. The vehicle system of claim 8, wherein the top of the tonneau cover includes a driver side leg and a passenger side leg that establish respective outboard sides of the access window.

11. The vehicle system of claim 1, wherein a drag coefficient of the vehicle is lower when the tonneau cover is in the tilted position than when the tonneau cover is in the lowered position.

12. The vehicle system of claim 1, wherein the actuator assembly comprises at least one linear actuator.

13. The vehicle system of claim 1, wherein the opposing wedge-shaped sides fit within slots of opposing bed walls of the cargo bed when the tonneau cover is in the lowered position.

14. The vehicle system of claim 1, wherein the opposing wedge-shaped sides extend downward from opposite outboard edges of the top.

15. A aerodynamic adjustment method:

transitioning a tonneau cover from a lowered position to a tilted position to reduce a drag coefficient of a vehicle, wherein a cargo bed includes opposing bed walls, wherein the tonneau cover includes wedge-shaped sides that are inboard the bed walls and are raised above the bed walls when the tonneau cover is in the tilted position.

16. The aerodynamic adjustment method of claim 15, comprising transitioning the tonneau cover from the tilted position to the lowered position to facilitate accessing the cargo bed of the vehicle.

17. The aerodynamic adjustment method of claim 15, wherein the transitioning comprises an automatic transitioning made in response to an operational condition of the vehicle.

18. The aerodynamic adjustment method of claim 17, wherein the operational condition comprises a speed of the vehicle.

19. A vehicle system, comprising:

a tonneau cover; and an actuator assembly that transitions the tonneau cover back-and-forth between a lowered position and a tilted position, the tonneau cover covering a cargo bed of a vehicle when the tonneau cover is in the lowered position and when the tonneau cover is in the tilted position, wherein the tonneau cover includes opposing side panels that extend downward from a top into the cargo bed when the tonneau cover is in the lowered position, the opposing side panels positioned inboard of bed walls of the cargo bed in the lowered position and raised above the bed walls in the tilted position.

20. The vehicle system of claim 19, wherein the opposing side panels of are wedge-shaped sides extending vertically downward from the top.

* * * * *